(12) United States Patent
Appani et al.

(10) Patent No.: US 9,014,137 B2
(45) Date of Patent: Apr. 21, 2015

(54) APPARATUS AND METHOD FOR PERSONALITY MODIFICATION DURING HANDOFF

(75) Inventors: Praveen Kumar Appani, San Diego, CA (US); Don Nielsen Andrus, Carlsbad, CA (US); Prasanna V. Badrinarayanan, San Diego, CA (US); Rajeev Subhas Kurundkar, San Diego, CA (US); Yonas Kidane, San Diego, CA (US); Sweta Parameswaran Iyer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1001 days.

(21) Appl. No.: 12/465,575

(22) Filed: May 13, 2009

(65) Prior Publication Data

US 2010/0040018 A1 Feb. 18, 2010

Related U.S. Application Data

(60) Provisional application No. 61/061,474, filed on Jun. 13, 2008.

(51) Int. Cl.
H04W 4/00 (2009.01)
H04W 36/00 (2009.01)

(52) U.S. Cl.
CPC ...... H04W 36/0033 (2013.01); H04W 36/0066 (2013.01)

(58) Field of Classification Search
None
See application file for complete search history.

(56) References Cited

U.S. PATENT DOCUMENTS

| 8,059,615 | B1 * | 11/2011 | Narendran et al. | 370/335 |
| 2002/0160777 | A1 * | 10/2002 | Takao et al. | 455/436 |
| 2003/0135626 | A1 | 7/2003 | Ray et al. | |
| 2003/0145091 | A1 * | 7/2003 | Peng et al. | 709/229 |
| 2005/0286470 | A1 * | 12/2005 | Asthana et al. | 370/331 |

(Continued)

FOREIGN PATENT DOCUMENTS

| CN | 1992949 A | 7/2007 |
| WO | WO2004079947 | 9/2004 |
| WO | WO2006110021 | 10/2006 |

OTHER PUBLICATIONS

International Search Report and Written Opinion—PCT/US2009/046630—ISA/EPO—Oct. 12, 2009.

(Continued)

*Primary Examiner* — Hassan Phillips
*Assistant Examiner* — Gautam Sharma
(74) *Attorney, Agent, or Firm* — Kevin T. Cheatham

(57) ABSTRACT

A method and apparatus for facilitating access terminal handoff between access networks is provided. The method may comprise: receiving, at a first access network (AN), an access channel message from an access terminal, wherein the access channel message includes information corresponding to a communication session between a second AN and the access terminal, wherein the communication session includes at least an active personality negotiated with the second AN, obtaining at least one personality, associated with the access terminal, previously negotiated by the first AN, determining if one of the at least one personalities is substantially similar to the active personality, and upon a determination that one of the at least one personalities is substantially similar to the active personality, transferring the communication session to the first AN with the substantially similar personality as the active personality.

32 Claims, 8 Drawing Sheets

(56) References Cited

U.S. PATENT DOCUMENTS

| | | | |
|---|---|---|---|
| 2006/0002345 A1* | 1/2006 | Lapraye | 370/331 |
| 2006/0079235 A1* | 4/2006 | Kim | 455/439 |
| 2006/0109817 A1* | 5/2006 | Ramanna et al. | 370/331 |
| 2006/0121856 A1* | 6/2006 | Itoh et al. | 455/69 |
| 2006/0123122 A1* | 6/2006 | Jung et al. | 709/227 |
| 2007/0149197 A1* | 6/2007 | Lee et al. | 455/436 |
| 2007/0223421 A1* | 9/2007 | Zafer et al. | 370/331 |
| 2007/0230600 A1* | 10/2007 | Bertrand et al. | 375/260 |
| 2007/0280161 A1* | 12/2007 | Rudrapatna et al. | 370/331 |
| 2008/0056168 A1* | 3/2008 | Sinnarajah et al. | 370/310 |
| 2008/0261593 A1* | 10/2008 | Wong et al. | 455/435.1 |
| 2008/0316968 A1* | 12/2008 | Sun et al. | 370/331 |

OTHER PUBLICATIONS

Lucent A., "3GPP2 HARP(EVDO) Session Setup and Handovers", 3GPP TSG RAN WG2 #58bis, R2-072695, 3GPP, Jun. 25, 2007, pp. 1-35.

* cited by examiner

APPARATUS AND METHOD FOR PERSONALITY MODIFICATION DURING HANDOFF

CLAIM OF PRIORITY UNDER 35 U.S.C. §119

The present Application for Patent claims priority to Provisional Application No. 61/061,484 entitled "Method for modifying the personalities which are stored as part of 1× EV-DO session negotiation when an Access Terminal (AT) moves between access network (AN) storing different number of personalities" filed Jun. 13, 2008, and assigned to the assignee hereof and hereby expressly incorporated by reference herein.

BACKGROUND

Background

Wireless communication systems are widely deployed to provide various types of communication (e.g., voice, data, multimedia services, etc.) to multiple users over wide geographic regions. Specifically, one type of communication, evolution data only (EV-DO), supports high data rate communication sessions. Access networks (AN) (e.g. base stations) are distributed throughout a coverage region to provide service to access terminals (e.g. mobile phones, portable computers, etc.).

In general, a handoff of services is performed when access terminal moves from a first based station and/or AN to a second base station and/or AN. For example, during a handoff of EV-DO service between two non-similar ANs, an access terminal must negotiate a communication session before it can begin to use network resources. Furthermore, an access terminal may use a multitude of different sessions for different purposes. Each negotiated set of protocols may be identified as a personality. Session negotiation, especially for an access terminal with multiple personalities, can be time-consuming and costly as multiple over-the-air communications may be needed to establish each EV-DO personality. Thus, there exists a need for a system and/or methodology for efficiently facilitating access terminal handoff between access networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating access terminal handoff between access networks. According to one aspect, a method for facilitating access terminal handoff between access networks is provided. The method can comprise: receiving, at a first access network (AN), an access channel message from an access terminal, wherein the access channel message includes information corresponding to a communication session between a second AN and the access terminal, wherein the communication session includes at least an active personality negotiated with the second AN, obtaining at least one personality, associated with the access terminal, previously negotiated by the first AN, determining if one of the at least one personalities is substantially similar to the active personality, and upon a determination that one of the at least one personalities is substantially similar to the active personality, transferring the communication session to the first AN with the substantially similar personality as the active personality.

Yet another aspect relates to at least one processor configured to facilitate access terminal handoff between access networks. The at least one processor can include a first module for receiving, at a first access network (AN), an access channel message from an access terminal, wherein the access channel message includes information corresponding to a communication session between a second AN and the access terminal, wherein the communication session includes at least an active personality negotiated with the second AN, a second module for obtaining at least one personality, associated with the access terminal, previously negotiated by the first AN, a third module for determining if one of the at least one personalities is substantially similar to the active personality, and a fourth module for transferring the communication session to the first AN with the substantially similar personality as the active personality, upon a determination that one of the at least one personalities is substantially similar to the active personality.

Still another aspect relates to a computer program product comprising a computer-readable medium. The computer-readable medium can include a first set of codes for causing a computer to receive, at a first access network (AN), an access channel message from an access terminal, wherein the access channel message includes information corresponding to a communication session between a second AN and the access terminal, wherein the communication session includes at least an active personality negotiated with the second AN, a second set of codes for causing a computer to obtain at least one personality, associated with the access terminal, previously negotiated by the first AN, a third set of codes for causing the computer to determine if one of the at least one personalities is substantially similar to the active personality, and a fourth set of codes for causing the computer to transfer the communication session to the first AN with the substantially similar personality as the active personality, upon a determination that one of the at least one personalities is substantially similar to the active personality.

Yet another aspect relates to an apparatus. The apparatus can include means for receiving, at a first access network (AN), an access channel message from an access terminal, wherein the access channel message includes information corresponding to a communication session between a second AN and the access terminal, wherein the communication session includes at least an active personality negotiated with the second AN, means for obtaining at least one personality, associated with the access terminal, previously negotiated by the first AN, means for determining if one of the at least one personalities is substantially similar to the active personality, and means for transferring the communication session to the first AN with the substantially similar personality as the active personality, upon a determination that one of the at least one personalities is substantially similar to the active personality.

Another aspect relates to an apparatus. The apparatus can include a receiver operable for receiving, at a first access network (AN), an access channel message from an access terminal, wherein the access channel message includes information corresponding to a communication session between a second AN and the access terminal, wherein the communication session includes at least an active personality negotiated with the second AN, and a personality manager operable for:

obtaining at least one personality, associated with the access terminal, previously negotiated by the first AN, determining if one of the at least one personalities is substantially similar to the active personality, and transferring the communication session to the first AN with the substantially similar personality as the active personality, upon a determination that one of the at least one personalities is substantially similar to the active personality.

Furthermore, in accordance with one or more aspects and corresponding disclosure thereof, various aspects are described in connection with facilitating personality modification by an access terminal during handoff between access networks. According to one aspect, a method for facilitating personality modification by an access terminal during handoff between access networks is provided. The method can comprise transmitting, from an access terminal, an access channel message to a first access network (AN), wherein the access channel message includes information corresponding to a communication session between a second AN and the access terminal, wherein the communication session includes at least an active personality negotiated with the second AN, and receiving instructions from the first AN to maintain the active personality by switching to the new communication session index for the active personality.

Yet another aspect relates to at least one processor configured to facilitate personality modification by an access terminal during handoff between access networks. The at least one processor can include a first module for transmitting, from an access terminal, an access channel message to a first access network (AN), wherein the access channel message includes information corresponding to a communication session between a second AN and the access terminal, wherein the communication session includes at least an active personality negotiated with the second AN, and a second module for receiving instructions from the first AN to maintain the active personality by switching to the new communication session index for the active personality.

Still another aspect relates to a computer program product comprising a computer-readable medium. The computer-readable medium can include a first set of codes for causing a computer to transmit, from an access terminal, an access channel message to a first access network (AN), wherein the access channel message includes information corresponding to a communication session between a second AN and the access terminal, wherein the communication session includes at least an active personality negotiated with the second AN, and a second set of codes for causing a computer to receive instructions from the first AN to maintain the active personality by switching to the new communication session index for the active personality.

Yet another aspect relates to an apparatus. The apparatus can include means for transmitting, from an access terminal, an access channel message to a first access network (AN), wherein the access channel message includes information corresponding to a communication session between a second AN and the access terminal, wherein the communication session includes at least an active personality negotiated with the second AN, and means for receiving instructions from the first AN to maintain the active personality by switching to the new communication session index for the active personality.

Another aspect relates to an apparatus. The apparatus can include a transmitter operable for transmitting, from an access terminal, an access channel message to a first access network (AN), wherein the access channel message includes information corresponding to a communication session between a second AN and the access terminal, wherein the communication session includes at least an active personality negotiated with the second AN, and a receiver operable for receiving instructions from the first AN to maintain the active personality by switching to the new communication session index for the active personality.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
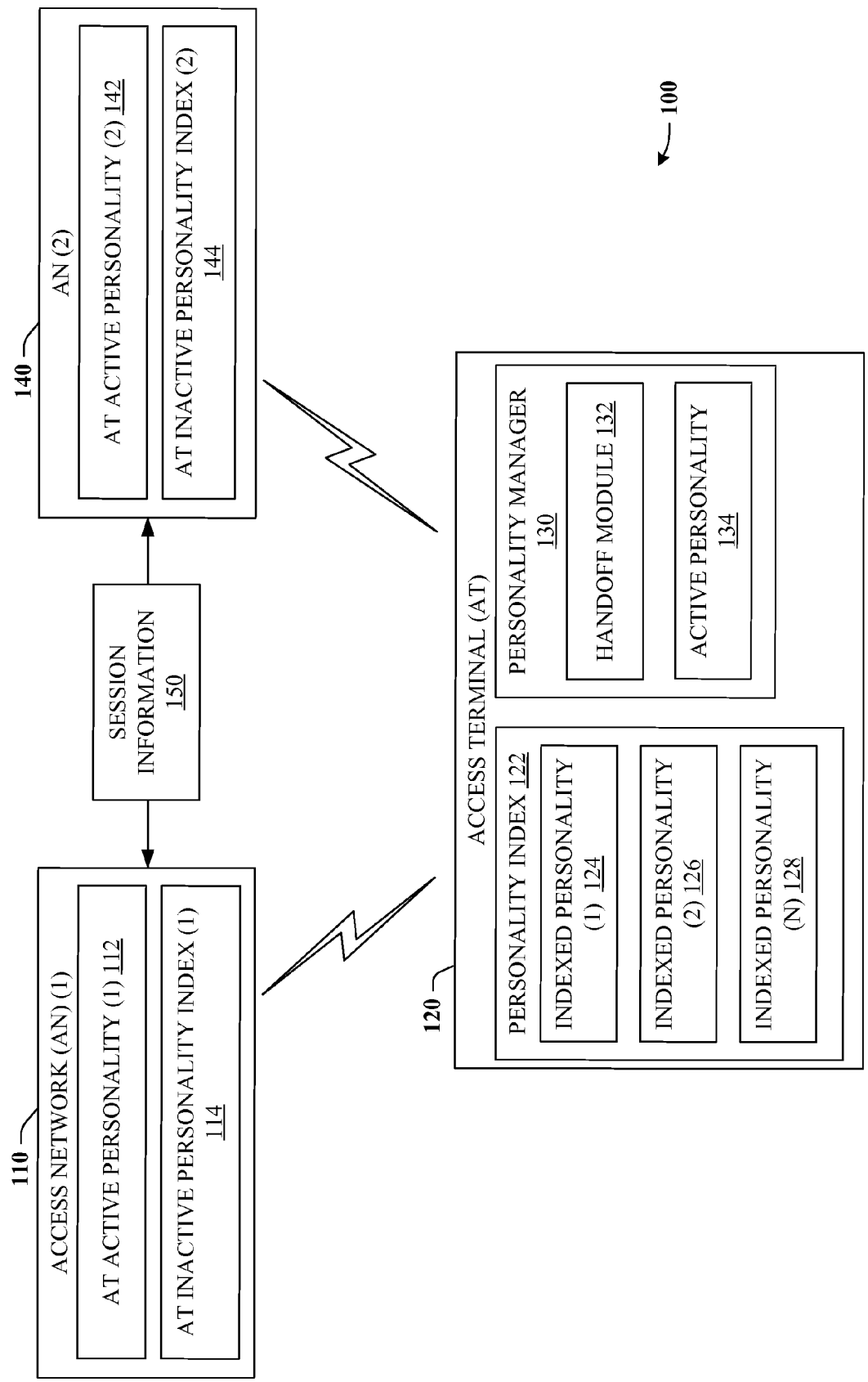
FIG. 1 illustrates a block diagram of an exemplary communication system that can facilitate access terminal handoff between access networks.

With reference to FIG. 1, exemplary communication system 100 that can facilitate access terminal 120 handoff between base transceiver stations and/or radio network controllers, referred to herein as access networks (AN) 110 and 140 is illustrated. The communication system 100 depicted in FIG. 1 may include a first AN 110, a second AN 140 and an access terminal 120. As an access terminal 120 moves from communicating with a first access network AN(1) 110 to communicating with a second access network AN(2) 140, a communication session, which may include, for example, multiple 1×EV-DO personalities, may be negotiated. Specifically, to avoid interruptions in the communication session, the session between the access terminal and the first AN may be transferred to the second AN. In one aspect, the session may include an active personality and possibly one or more inactive personalities. By way of example and not limitation, a personality may include a negotiated set of protocols between an access terminal and an AN. An access terminal and an AN can negotiate multiple personalities during a session configuration but may only use one personality at a time during communications. For example, each personality defines a communication configuration, which may include one or more parameters that define a characteristic of the communication session. For instance, such parameters may include, but are not limited to, an AT identifier, a communication protocol identifier, an application identification, and quality of service parameters, such as latency, bandwidth, throughput/goodput, etc. In one aspect, when an access terminal and the second AN have previously negotiated an equivalent active personality, a handoff may be performed without a full renegotiate of the active personality session.

Access terminal 120 may further include a personality index 122 for storing negotiated and indexed personalities and a personality manager 130 for handling the creation and use of such personalities. Personality manager 130 may further comprise handoff module 132 to assist in determining when to perform a handoff between ANs (e.g. 110, 140). For example, handoff module 132 may determine when to switch between ANs at least in part depending on one or more of signal strength, service provider information, user preferences, etc. Additionally, personality manager 130 may further comprise active personality 134 used during an active communication session with a first AN 110. For example, a 1×EV-DO session may be used by an access terminal to effectuate high data transfer rates between the access terminal and the servicing AN. The 1×EV_DO session may include multiple personalities to more effectively facilitate a variety of tasks. As only one personality may be in use at a time, the personality currently in use may be referred to as the active personality 134. Personality index 122 may further include one or more indexed personalities (124, 126, 128). In one aspect, each personality may be negotiated with an AN, and each personality may be uniquely indexed in the personality index. For example, a first AN (e.g. 110) may have negotiated four personalities with the access terminal 120, and a second AN (e.g. 140) may have negotiated two personalities with the access terminal 120.

As depicted in FIG. 1, AT may initiate a handoff from AN(1) 110 to AN(2) 140. The first AN 110 may further include an access terminal active personality module 112 and an access terminal inactive personality index module 114. Access terminal active personality module 112 may facilitate communication with the access terminal 120 using the negotiated and committed active personality. Access terminal inactive personality index module 114 may be operable to recall any number of a variety of negotiated inactive personalities when said inactive personality is selected to facilitate communication between the AN 110 and the access terminal 120.

The second AN 140 may further include an access terminal active personality module 142 and an access terminal inactive personality index module 144. Active personality module 142 may be operable to facilitate transition of the active personality for access terminal 120 and the AN 110 to an active personality session with AN 140. In one aspect, a threshold level of equivalence between active personality 112 and active personality 142 may be determined by a service provider, an AN administrator, etc. For example, active personality module 142 may perform a field by field comparison between the active personality for access terminal 120 and the AN 110 and any personalities stored with AN 140. In one aspect, AN 140 may include default personalities or fields of personalities to be used during comparisons of personalities. In one aspect, active personality module 142 determines that a threshold level of equivalence is met (e.g. the active personalities are substantially similar) when communication fields sufficient to not require any subsequent negotiations between AN 140 and access terminal 120 prior to establishing a communication session are present. In one aspect, a threshold level of equivalence for two personalities is met if the personalities use the same protocol subtypes and further values of negotiated attributes are the same or substantially similar. As such, an access terminal may transition between ANs without extended interruptions associated with negotiating a new active personality. Furthermore, backhaul traffic may be reduced by eliminating new active personality negotiation communications between AN 140 and access terminal 120.

In one aspect, inactive personality module 144 may be operable to facilitate transition of at least one inactive personality for access terminal 120 on the AN 110 to at least one inactive personality indexed with AN 140. In operation, to avoid over taxing over-the-air resources between an AN and an access terminal, the inactive personality module 234 may request session information 150 from AN 110. In one aspect, this request 150 may be performed using an A13 SessionInfoReq message. Thereafter, the AN 110 may respond to the request with inactive personality information for sessions between the AN 110 and access terminal 120. The AN 140 may then determine if any received inactive personalities are equivalent to any stored personalities AN 140 has with respect to the requesting access terminal 120. For example, the AN 140 may use the Unicast Access Terminal Identifier (UATI) for the access terminal 120 to search access terminal personalities previously negotiated between the AN 140 and the access terminal 120. Further, for example, in one aspect, when AT 120 performs a handoff between AN 110 to AN 140, an access channel message sent by AT 120 has the Unicast Access Terminal Identifier (UATI). This UATI can be used by AN 140 to retrieve the session information, including the active personality or both the active and inactive personalities, from AN 110 using the UATI through an A13 procedure as defined in IS-878 or the like.

Figure 2:
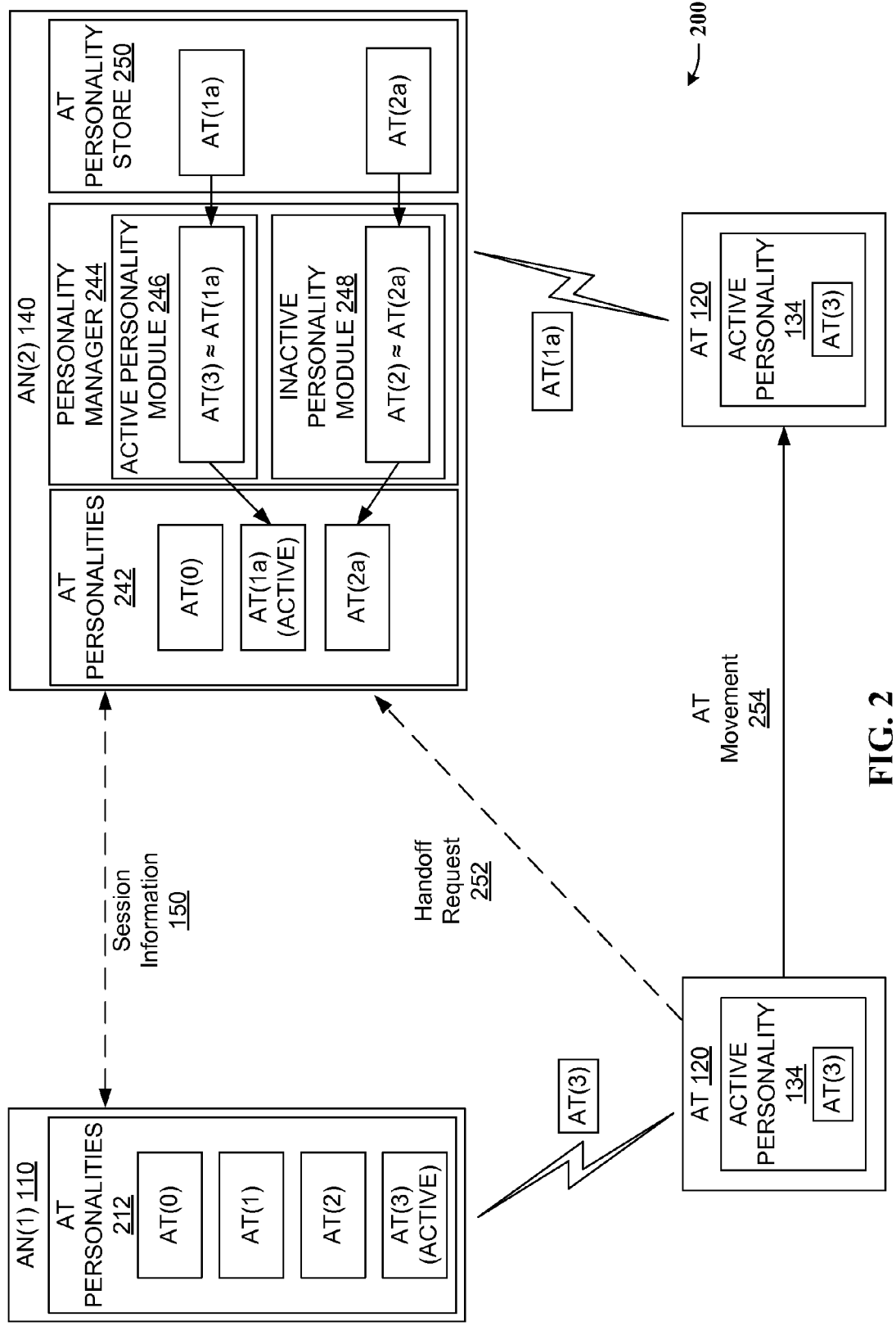
FIG. 2 illustrates a block diagram of an exemplary communication system operating to facilitate access terminal handoff between access networks.

With reference to FIG. 2, illustrated is a block diagram of an exemplary communication system 200 operating to facilitate access terminal handoff between access networks. Example system 200 comprises multiple access networks (AN) 110, 140, and an access terminal (AT) 120. AN and AT are described in greater detail with reference to FIGS. 3 and 4 respectively. As depicted, AT 120 is moving 254 from a coverage region serviced by AN(1) 110 to a coverage region serviced by AN(2). As such, AT 120 may request a handoff of service 252 from AN(1) 110 to AN(2) 140. As depicted, AN(1) 110 supports four personalities (0, 1, 2, 3) and AN(2) 140 supports three personalities (0, 1, 2). Furthermore, access terminal 120 may have been actively using personality index 3 of AN(1) prior to the handoff. Still further, in the depicted example, personality index 3 of AN(1) 110 is equivalent to the personality index 1 of AN(2) 140.

In operation, a handoff request 252 may be send to AN(2) 140. Detailed descriptions of operations are also discussed with respect to FIGS. 5 and 6. In one aspect, the request may include active personality information. After AN(2) 140 receives the handoff request 252, active personality module 246 may obtain possible personalities matching the access terminal 120 from AT personality store 250. For example, the AN(2) 140 may use the Unicast Access Terminal Identifier (UATI) for the access terminal 120 to search the AT personality store at AN(2) 140 for personalities previously negotiated between the AN 140 and the access terminal 120. In the depicted example, AT personality store 250 stores at least personalities AT(1*a*) and AT(2*a*). Active personality module 246 may compare the received active personality, AT(3) in the depicted illustration, with AT(1*a*) from AT personality store 250. Upon a determination that the personalities are substantially similar, as described in further detail below, AN(2) 140 may use AT(1*a*) to communicate with AT 120 without any need to renegotiate the active personality.

Furthermore, in one aspect, inactive personality module 248 may be operable to facilitate transition of at least one inactive personality, such as AT(2), from AN(1) 110 to at least one inactive personality indexed with AN(2) 140. In operation, to avoid over taxing over-the-air resources between an AN and an AT, the inactive personality module 248 may request session information 150 from AN(1) 110. In one aspect, this request 150 may be performed using an A13 SessionInfoReq message. Thereafter, the AN(1) 110 may respond to the request with inactive personality information for sessions between the AN 110 and access terminal 120. The inactive personality module 248 may then determine if any received inactive personalities, such as AT(2) are equivalent to any stored personalities AN 140 has with respect to the requesting access terminal 120, such as AT(2*a*). If such a equivalence is found, inactive personality module 248 may include AT(2*a*) as an inactive personality available for use by AT 120.

Figure 3:
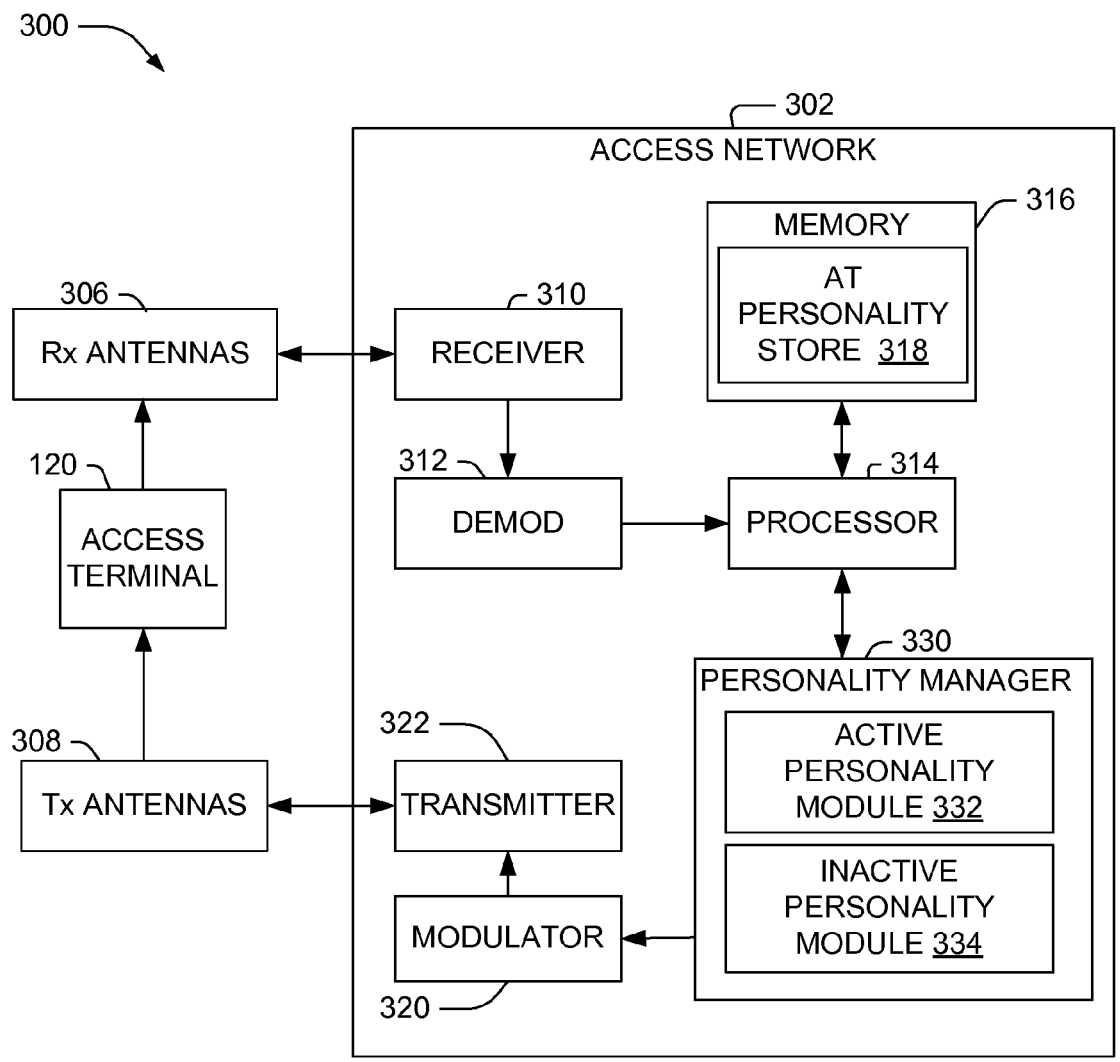
FIG. 3 illustrates a block diagram of an exemplary architecture of an access network configured to facilitate access terminal handoff between access networks, according to the described aspects.

With reference to FIG. 3, illustrated is an example system 300 that comprises an access network 302 with a receiver 310 that receives signal(s) from one or more user devices 110 through a plurality of receive antennas 306, and a transmitter 322 that transmits to the one or more user devices 110 and/or to one or more network managers 150 through a transmit antenna 308. Receiver 310 can receive information from receive antennas 306 and is operatively associated with a demodulator 312 that demodulates received information. Demodulated symbols are analyzed by a processor 314, and which is coupled to a memory 316 that stores, among other items, information related to mobile device performance measurements and location. Processor 314 can be a processor dedicated to analyzing information received by receiver 310 and/or generating information for transmission by a transmitter 322, a processor that controls one or more components of access network 302, and/or a processor that both analyzes information received by receiver 310, generates information for transmission by transmitter 322, and controls one or more components of access network 302. As noted above, access network 302 can additionally comprise memory 316 that is operatively coupled to processor 314 and which stores, among other items, information related to personalities previously negotiated with various access terminals. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 316 of the subject apparatus and methods is intended to comprise, without being limited to, these and any other suitable types of memory. Furthermore, in one aspect, memory 316 can include access terminal personality store 318 to facilitate organizing stored information related to previously negotiated personalities.

In one aspect, access terminal personality store 318 may use a unicast access terminal identifier (UATI) to couple personalities to access terminals. Access terminal personality store 318 may include information related to personalities previously negotiated with various access terminals. For example, an access terminal that previously interacted with the AN may have negotiated 4 personalities, and to facilitate subsequent access by the access terminal these negotiated personalities may be stored so as to avoid additionally time spent to renegotiate the personalities. In another aspect, a new AN which has not previously communicated with the AT may assign a new UATI to the AT.

Processor 314 is further coupled to personality manager 330. Personality manager 330 may include active personality module 332, inactive personality module 334, and indexing module 336. In one aspect, active personality module 332 may be operable to facilitate transition of the active personality for access terminal 120 and the previous AN to an active personality session with the handoff receiving AN. In one aspect, inactive personality module 334 may be operable to facilitate transition of at least one inactive personality for access terminal 120 and the previous AN, from the previous AN to at least one inactive personality indexed with the handoff receiving AN. To avoid over taxing over-the-air resources between an AN and an access terminal, the inactive personality module 334 may request session information from the previously connected AN. In one aspect, this request may be performed using an A13 SessionInfoReq. Thereafter, the previously connected AN may respond to the request with personality information for sessions between the previously connected AN and access terminal. The handoff receiving AN may then determine if any inactive personalities are equivalent to any stored personalities the handoff receiving AN has with respect to the requesting access terminal. For example, the handoff receiving AN may use the UATI for the access terminal to search access terminal personality store 318 for personalities previously negotiated between the handoff receiving AN and the access terminal.

Figure 4:
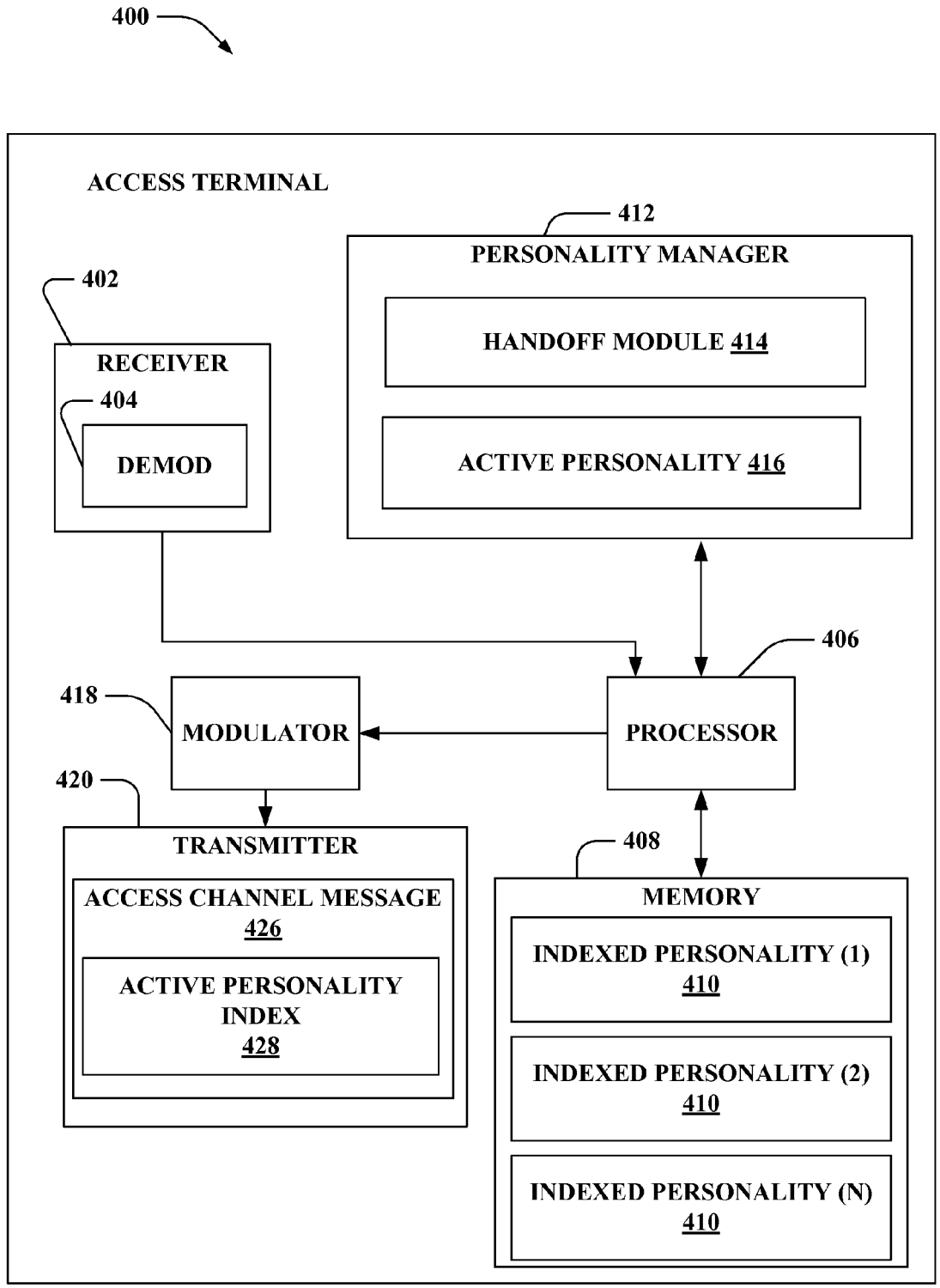
FIG. 4 illustrates a block diagram of an exemplary architecture of an access terminal configured to facilitate access terminal handoff between access networks, according to the described aspects.

With reference to FIG. 4, illustrated is an exemplary architecture of an access terminal 400 configured to facilitate handoff between access networks (e.g. 202). Access terminal 400 comprises a receiver 402 that receives a signal from, for instance, a receive antenna (not shown), performs typical actions on (e.g., filters, amplifies, downconverts, etc.) the received signal, and digitizes the conditioned signal to obtain samples. Receiver 402 can comprise a demodulator 404 that can demodulate received symbols and provide them to a processor 406 for channel estimation. Processor 406 can be a processor dedicated to analyzing information received by receiver 402 and/or generating information for transmission by a transmitter 420, a processor that controls one or more components of access terminal 400, and/or a processor that both analyzes information received by receiver 402, generates information for transmission by transmitter 420, and controls one or more components of access terminal 400.

Furthermore, transmitter 420 may transmit, among other data or the like, access channel message 426. Access channel message 426 may include active personality index 428. Access channel message 424 may be transmitted when access terminal 400 attempts a handoff between two ANs. In one aspect, an access channel message 424 may include a unicast access terminal identifier (UATI), a session token, such as a session configuration token (SCT), etc. The session token may further be used to relay to a receiving AN the access terminal active personality index 428.

Access terminal 400 can additionally comprise memory 408 that is operatively coupled to processor 406 and that can store data to be transmitted, received data, information related to available channels, data associated with analyzed signal and/or interference strength, information related to an assigned channel, power, rate, or the like, and any other suitable information for estimating a channel and communicating via the channel. Memory may include indexed personalities 410(1)-(N). AN indexed personalities 410 may at least in part depend on prior communication sessions between the access terminal 400 and various ANs. In one aspect, a first AN (e.g. AN(1)) may have negotiated four personalities with the access terminal 400, while a second AN (e.g. AN(2)) may have negotiated two personalities with the access terminal 400. Memory 408 can additionally store protocols and/or algorithms associated with estimating and/or utilizing a channel (e.g., performance based, capacity based, etc.).

It will be appreciated that the data store (e.g., memory 408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 408 of the subject systems and methods is intended to comprise, without being limited to, these and any other suitable types of memory.

Access terminal 400 can further comprise a personality manager 412 to facilitate efficient handoff between access networks. Personality manager 412 may further comprise handoff module 414 to assist in determining when to perform a handoff between ANs. For example, handoff module 414 may determine when to switch between ANs at least in part depending on signal strength, service provider information, user preferences, etc. Additionally, personality manager 412 may further comprise active personality 416 used for facilitating an active communication session. For example, a 1×EV-DO session may be used by an access terminal to effectuate high data transfer rates between the access terminal and the servicing AN. The 1×EV_DO session may include multiple personalities to more effectively facilitate a variety of tasks. As only one personality may be in use at a time, the personality currently in use may be referred to as the active personality 416.

Figure 5:
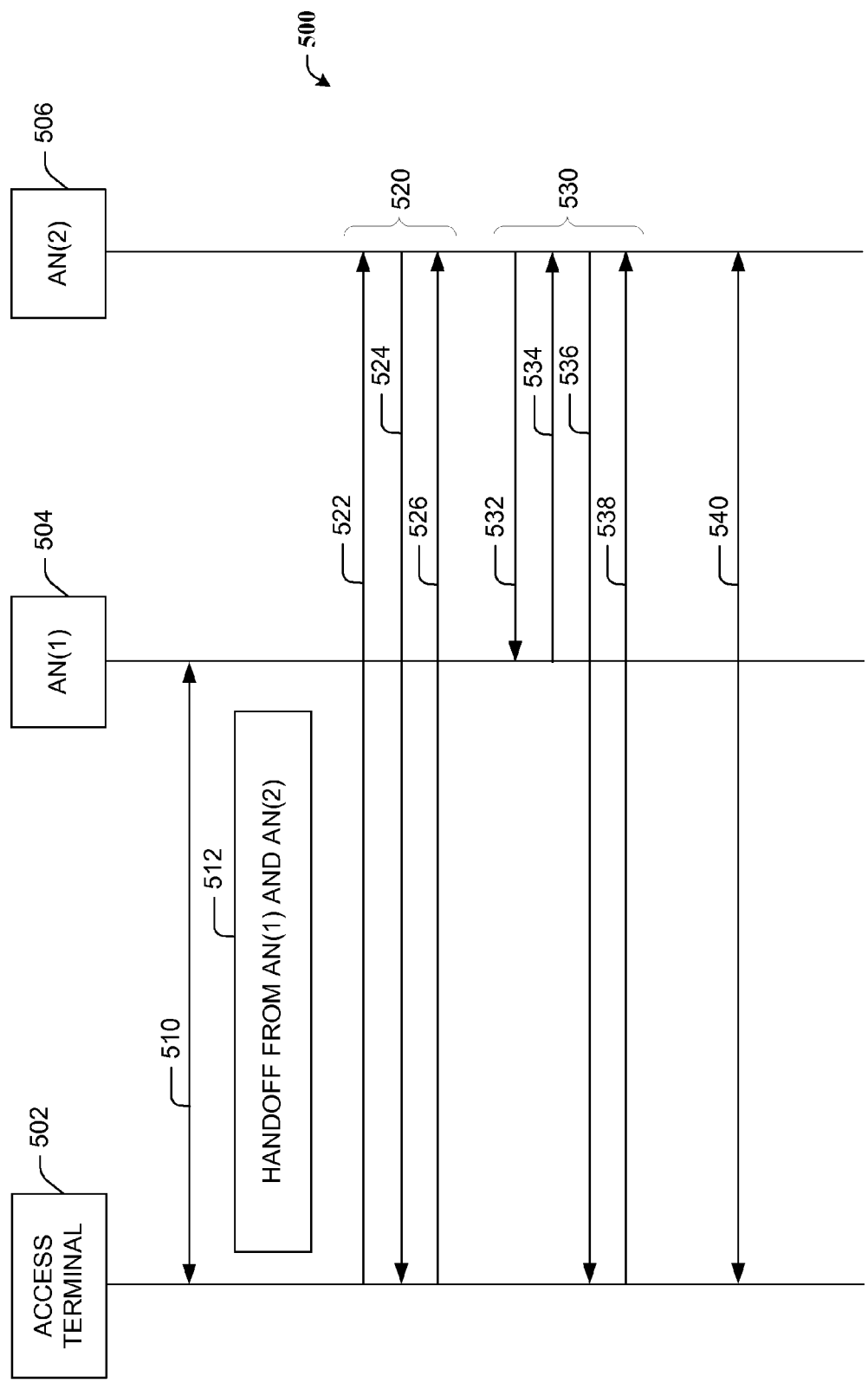
FIG. 5 is a call flow diagram of an aspect of a call flow of the system of FIG. 1.

While still referencing FIG. 1, but turning also to FIG. 5, in one non-limiting aspect, a call flow diagram of an aspect of a call flow of the system 500 is illustrated. As depicted, access terminal 502 has an established communication session 510 with a first AN 504 (e.g. AN(1)). In the depicted illustration, AN(1) 504 supports more personalities than AN(2) 506. For example, AN(1) 504 may support four personalities (0, 1, 2, 3) and AN(2) 506 may support three personalities (0, 1, 2). Furthermore, access terminal 502 may have been actively using personality index 3 of AN(1) prior to the handoff. Still further, in the depicted example, personality index 3 of AN(1) 504 is equivalent to the personality index 1 of AN(2) 506.

At act 512, an handoff between AN(1) and a second AN 506 (e.g. AN(2)) may be initiated. For example, when an access terminal moves out of the coverage area of AN(1) 504 and into the coverage area of AN(2) 506, the access terminal may initiate a handoff so as to avoid an interruption in service provided to a user. At act 522, access terminal 502 may transmit an access request, such as but not limited to, an access channel message to AN(2) 506. The message may further include a unicast access terminal identifier (UATI), a session token, such as a session configuration token (SCT), etc. The session token may further be used to relay to AN(2) 506 the access terminal 502 active personality. For example, access terminal 502 may be actively communicating using personality index 3 of AN(1).

Upon receipt of the access request, AN(2) 506 may process a handoff for the active personality (420). AN(2) 506 may determine if the active personality (personality index 3 of AN(1) in the depicted example) is equivalent to any stored personalities AN(2) has with respect to the requesting access terminal 502. In one aspect, a threshold level of equivalence is met (e.g. the active personalities are substantially similar) when communication fields sufficient to not require any subsequent negotiations between AN(2) and access terminal 502 prior to establishing a communication session are present. In one aspect, AN(2) may use the UATI for the access terminal 502 to search a store of personalities previously negotiated between AN(2) 506 and the access terminal 502. In another aspect, AN(2) may determine an equivalent of the active personality by retrieving active personality information from AN(1). In still another aspect, AN(2) may use the SCT, transmitted by the access terminal 502, to search a store of personalities previously negotiated between AN(2) 506 and the access terminal 502. In the depicted example, AN(2) 506 obtains a personality equivalent to the active personality being used with AN(1), for example personality index 1 to AN(2). In one aspect, the threshold level of equivalence may be determined by a service provider, an AN administrator, etc. In such an aspect, a service provider or the like may determine which fields in an active personality must match for the personalities to be considered substantially similar and may provide default values for other fields or allow the previous settings for those fields to remain. In another aspect, a service provider may define a range of values in one or more fields that may be present in an active personality that is maintained. At act 524, AN(2) 506 may transmit a message to access terminal 502 to copy personality index 3 to index 1. Additionally, AN(2) may activate personality index 1. In one aspect, AN(2) may hardlink stream personality index 3 of AN(1) 504 to personality index 1 of AN(2) 506. At act 526, access terminal 502 transmits acknowledgement of the active personality index change. Thereafter, access terminal 502 may continue communications with AN(2) 506 (act 540) using the equivalent active personality the access terminal 502 was using with AN(1) 504 without the need to fully renegotiate the active personality during the handoff.

In one aspect (430), AN(2) 506 may further reduce the frequency of personality negotiations by communicating with AN(1) 504 with regard to inactive personalities indexed to AN(1) 504 for access terminal 502. At act 532, AN(2) 506 may request session information from AN(1) 504. In one aspect, this request may be performed using an A13 SessionInfoReq. At act 534, AN(1) 504 may respond to the request from AN(2) 506 with personality information for sessions between AN(1) and access terminal 502. AN(2) may then determine if any inactive personalities are equivalent to any stored personalities AN(2) has with respect to the requesting access terminal 502 (e.g. personality indexes 1 of AN(2) and 2 of AN(1) in the depicted example). For example AN(2) may use the UATI for the access terminal 502 to search a store of personalities previously negotiated between AN(2) 506 and the access terminal 502. In the depicted example, AN(2) 506 obtains a personality equivalent to an inactive personality negotiated with AN(1) (for example personality index 1 of AN(1) may be equivalent to personality index 2 of AN(2)). At act 536, AN(2) 506 may transmit a message to access terminal 502 to copy personality index 1 to index 2. At act 538, access terminal 502 transmits acknowledgement of any inactive personality index changes. In one aspect, AN(2) may hardlink stream any inactive personality index of AN(1) 504 to an inactive personality index of AN(2) 506. For example, AN(2) may hardlink stream inactive personality index 1 of AN(1) 504 to inactive personality index 2 of AN(2) 506. Furthermore, at act 524 and/or act 536, AN(2) may transmit a message to delete personalities of AN(1) that are not equivalent to personalities of AN(2), and at acts 526 and/or 528 access terminal 502 may acknowledge deletion of said personalities. At act 540, the handoff may be complete and access terminal 502 may communicate with AN(2) 506.

Figure 6:
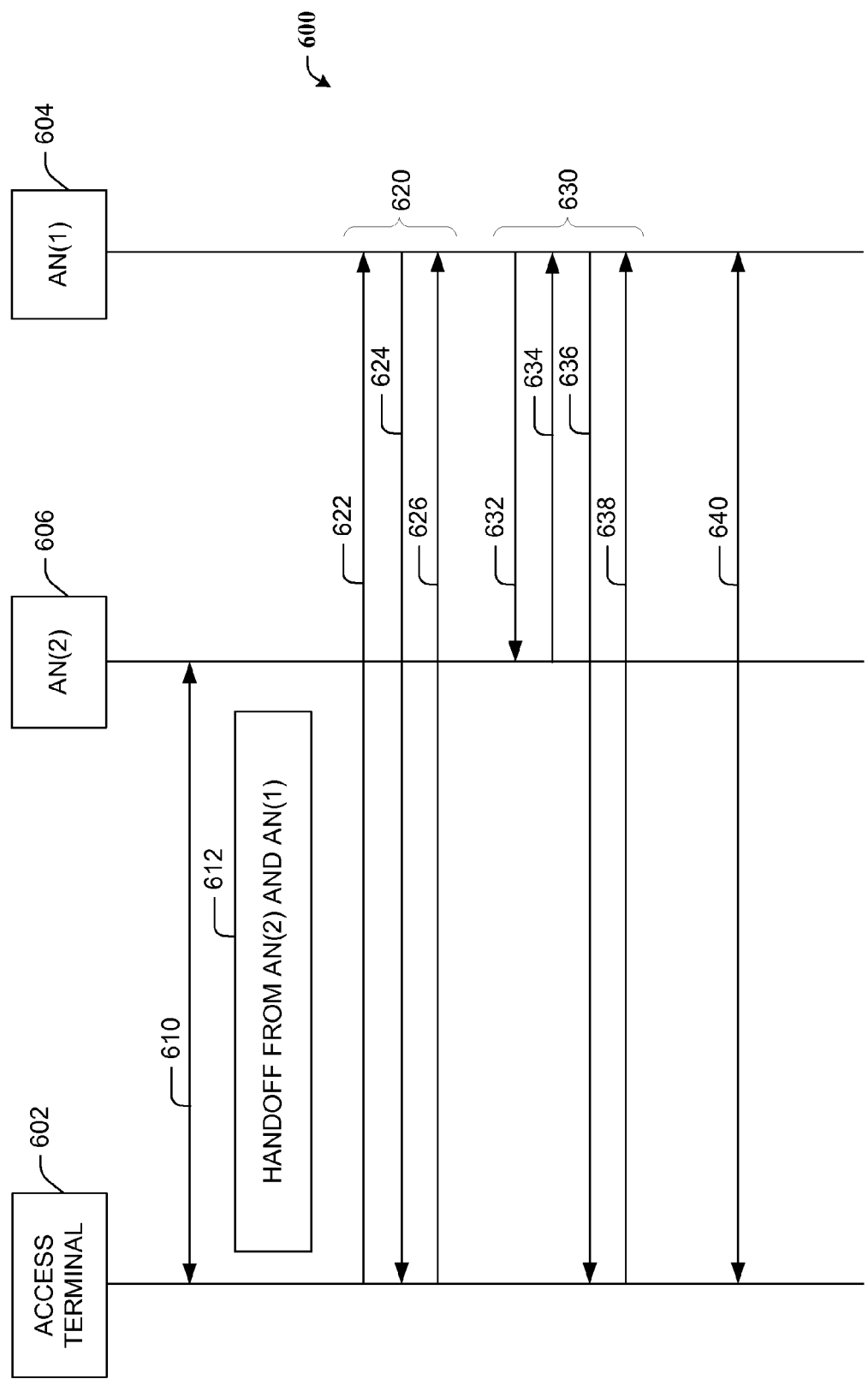
FIG. 6 is a call flow diagram of another aspect of a call flow of the system of FIG. 1.

While still referencing FIG. 1, but turning also to FIG. 6, in one non-limiting aspect, a call flow diagram of an aspect of a call flow of the system 600 is illustrated. As depicted, access terminal 602 has an established communication session 610 with a second AN 606 (e.g. AN(2)). In the depicted illustration, AN(1) 604 supports more personalities than AN(2) 606. For example, AN(1) 604 may support four personalities (0, 1, 2, 3) and AN(2) 606 may support three personalities (0, 1, 2). Furthermore, access terminal 602 may have been actively using personality index 1 of AN(2) 606 prior to the handoff. Still further, in the depicted example, personality index 3 of AN(1) 604 is equivalent to the personality index 1 of AN(2) 606.

At act 612, an handoff between AN(2) and a first AN 606 (e.g. AN(1)) may be initiated. For example, when an access terminal moves out of the coverage area of AN(2) 606 and into the coverage area of AN(1) 604, the access terminal may initiate a handoff so as to avoid an interruption in service provided to a user. At act 622, access terminal 602 may transmit an access request, such as but not limited to, an access channel message to AN(1) 604. The message may further include a unicast access terminal identifier (UATI), a session token, such as a session configuration token (SCT), etc. The session token may further be used to relay to AN(1) 604 the access terminal 602 active personality. For example, access terminal 602 may be actively communicating using personality index 1 of AN(2).

Upon receipt of the access request, AN(1) may process a handoff for the active personality (520). AN(2) may determine if the active personality (personality index 1 of AN(2) in the depicted example) is equivalent to any stored personalities AN(1) has with respect to the requesting access terminal 602. For example AN(1) may use the UATI for the access terminal 602 to search a store of personalities previously negotiated between AN(1) 604 and the access terminal 602. In the depicted example, AN(1) 604 obtains a personality equivalent to the active personality being used with AN(2) 606, for example personality index 3 to AN(1). At act 624, AN(1) 606 may transmit a message to access terminal 602 to copy personality index 1 to index 3. Additionally, AN(1) may activate personality index 3. In one aspect, AN(1) may hardlink stream personality index 1 of AN(2) 606 to personality index 3 of AN(1) 604. At act 626, access terminal 602 transmits acknowledgement of the active personality index change. Thereafter, access terminal 602 may communication with AN(1) 604 (act 440) using the equivalent active personality the access terminal 602 was using with AN(2) 606 without the need to fully renegotiate the active personality during the handoff.

In one aspect (530), AN(1) 604 may further reduce the frequency of personality negotiations by communicating with AN(2) 606 with regard to inactive personalities indexed to AN(2) 606 for access terminal 602. At act 632, AN(1) 604 may request session information from AN(2) 606. In one aspect, this request may be performed using an A13 SessionInfoReq format. At act 634, AN(2) 606 may respond to the request from AN(1) 604 with inactive personality information for sessions between AN(2) and access terminal 602. AN(1) may then determine if any inactive personalities are equivalent to any stored personalities AN(1) has with respect to the requesting access terminal 602 (e.g. personality indexes 1 of AN(2) and 2 of AN(1) in the depicted example). For example AN(1) may use the UATI for the access terminal 602 to search a store of personalities previously negotiated between AN(1) 604 and the access terminal 602. In the depicted example, AN(1) 606 obtains a personality equivalent to an inactive personality negotiated with AN(1) (for example personality index 1 of AN(1) may be equivalent to personality index 2 of AN(2)). At act 636, AN(1) 604 may transmit a message to access terminal 602 to copy equivalent inactive personalities (e.g. index 2 to index 1). At act 638, access terminal 602 transmits acknowledgement of any inactive personality index changes. In one aspect, AN(1) may hardlink stream any inactive personality index of AN(2) 606 to an inactive personality index of AN(1) 604. For example, AN(1) may hardlink stream inactive personality index 2 of AN(2) 606 to inactive personality index 1 of AN(1) 604. Furthermore, at act 624 and/or act 636, AN(1) may transmit a message to delete personalities of AN(2) that are not equivalent to personalities of AN(1), and at acts 626 and/or 628 access terminal 602 may acknowledge deletion of said personalities. In one aspect, when a receiving AN has both space for additional personalities, and no equivalent personalities, then at act, 640, a session negotiation between the receiving AN (e.g. AN(1)) and the access terminal 604 may be performed to populate the additional personality indexes. Furthermore, at act 640, the handoff may be complete and access terminal 602 may communicate with AN(1) 604.

Figure 7:
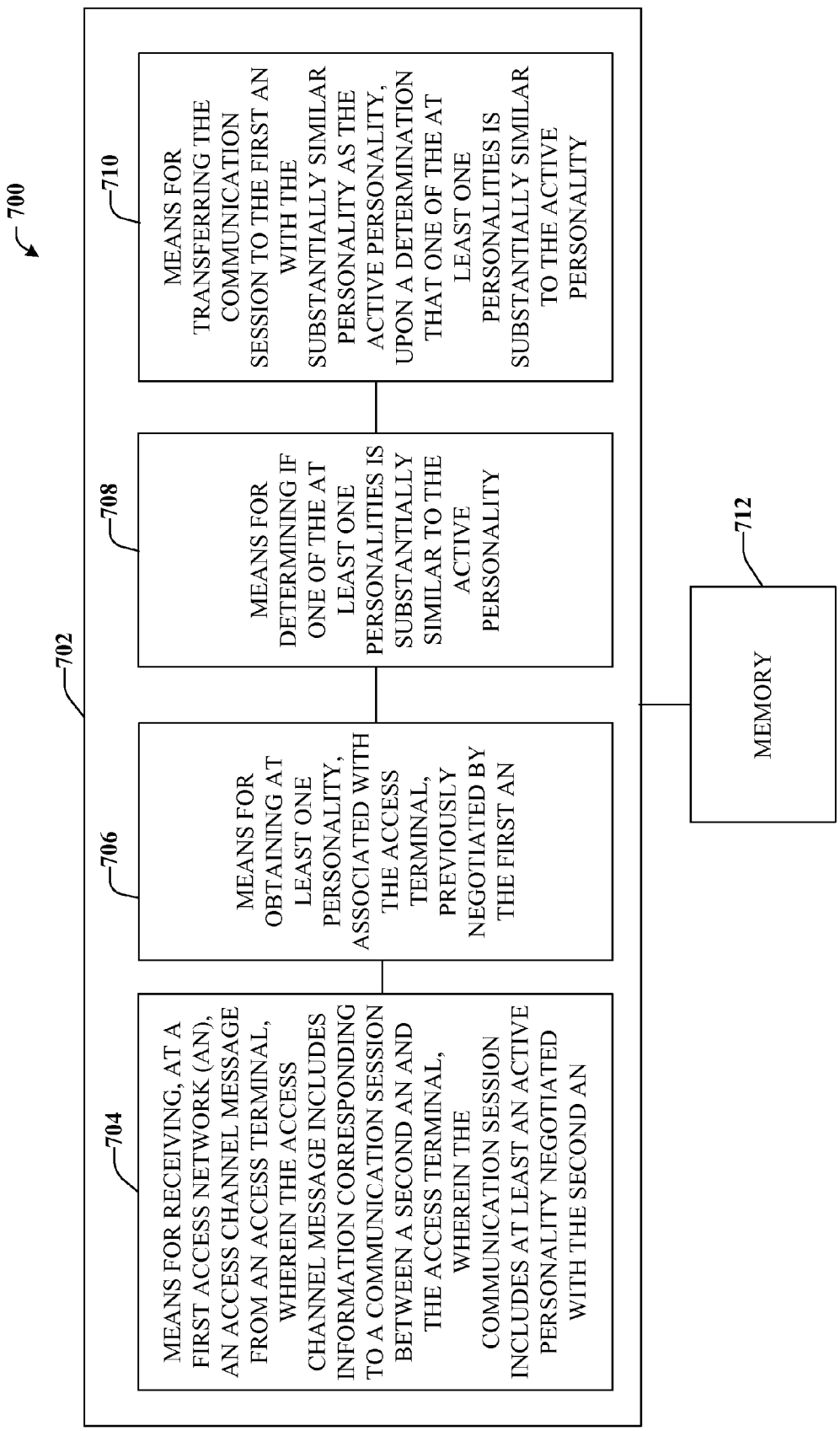
FIG. 7 depicts a block diagram of an exemplary communication system that can facilitate access terminal handoff between access networks.

With reference to FIG. 7, illustrated is a system 700 that facilitates access terminal handoff between access networks. For example, system 700 can reside at least partially within a base station, mobile device, etc. According to another example aspect, system 700 can reside at least partially within an access terminal. It is to be appreciated that system 700 is represented as including functional blocks, which can be functional blocks that represent functions implemented by a processor, software, or combination thereof (e.g., firmware).

System 700 includes a logical grouping 702 of means that can act in conjunction. For instance, logical grouping 502 can include means for receiving, at a first access network (AN), an access channel message from an access terminal, wherein the access channel message includes information corresponding to a communication session between a second AN and the access terminal, wherein the communication session includes at least an active personality negotiated with the second AN 704. For example, an access channel message may include a unicast access terminal identifier (UATI), a session token, such as a session configuration token (SCT), etc. The session token may further be used to relay to a receiving AN the access terminal active personality. Further, logical grouping 702 can include means for obtaining at least one personality, associated with the access terminal, previously negotiated by the first AN 706. For example, the receiving AN may use the UATI for the access terminal to search a store of personalities for previously negotiated personalities between the AN and the access terminal.

Further, logical grouping 702 can comprise means for determining if one of the at least one personalities is substantially similar to the active personality 708. Additionally, logical grouping 702 can comprise means for transferring the communication session to the first AN with the substantially similar personality as the active personality, upon a determination that one of the at least one personalities is substantially similar to the active personality 710. For example, the handoff receiving AN may transmit a message to the access terminal to maintain the active personality by switching to the new communication session index for the active personality. Additionally, the handoff receiving AN may transmit a message to the access terminal to reindex any substantially similar inactive personalities indexed in the communication session between the second AN and the AT to inactive personalities indexed in the transferred communication session between the first AN and the AT. Furthermore, access terminal may transmit acknowledgement of the active personality index change.

Based at least in part on this information, options for possible communication sessions can be inferred. Additionally, system 700 can include a memory 712 that retains instructions for executing functions associated with the means 704, 706, 708 and 710. While shown as being external to memory 712, it is to be understood that one or more of the means 704, 706, 708 and 710 can exist within memory 712.

Figure 8:
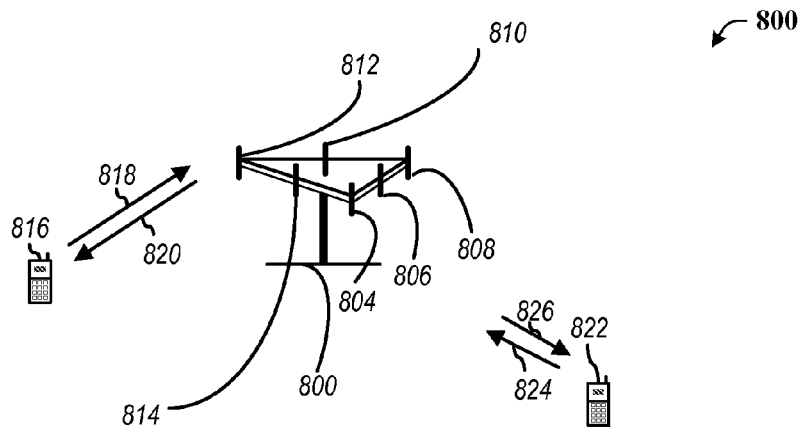
FIG. 8 illustrates an exemplary multiple access wireless communication system according to an aspect.

Referring to FIG. 8, a multiple access wireless communication system according to one aspect is illustrated. An access point 800 (AP) includes multiple antenna groups, one including 804 and 806, another including 808 and 810, and an additional including 812 and 814. In FIG. 8, only two antennas are shown for each antenna group, however, more or fewer antennas may be utilized for each antenna group. Access terminal 816 (AT) is in communication with antennas 812 and 814, where antennas 812 and 814 transmit information to access terminal 816 over forward link 820 and receive information from access terminal 816 over reverse link 818. Access terminal 822 is in communication with antennas 806 and 808, where antennas 806 and 808 transmit information to access terminal 822 over forward link 826 and receive information from access terminal 822 over reverse link 824. In a FDD system, communication links 818, 820, 824 and 826 may use different frequency for communication. For example, forward link 820 may use a different frequency then that used by reverse link 818.

Each group of antennas and/or the area in which they are designed to communicate is often referred to as a sector of the access point. In the aspect, antenna groups each are designed to communicate to access terminals in a sector, of the areas covered by access point 800.

In communication over forward links 820 and 826, the transmitting antennas of access point 800 utilize beamforming in order to improve the signal-to-noise ratio of forward links for the different access terminals 816 and 824. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 9:
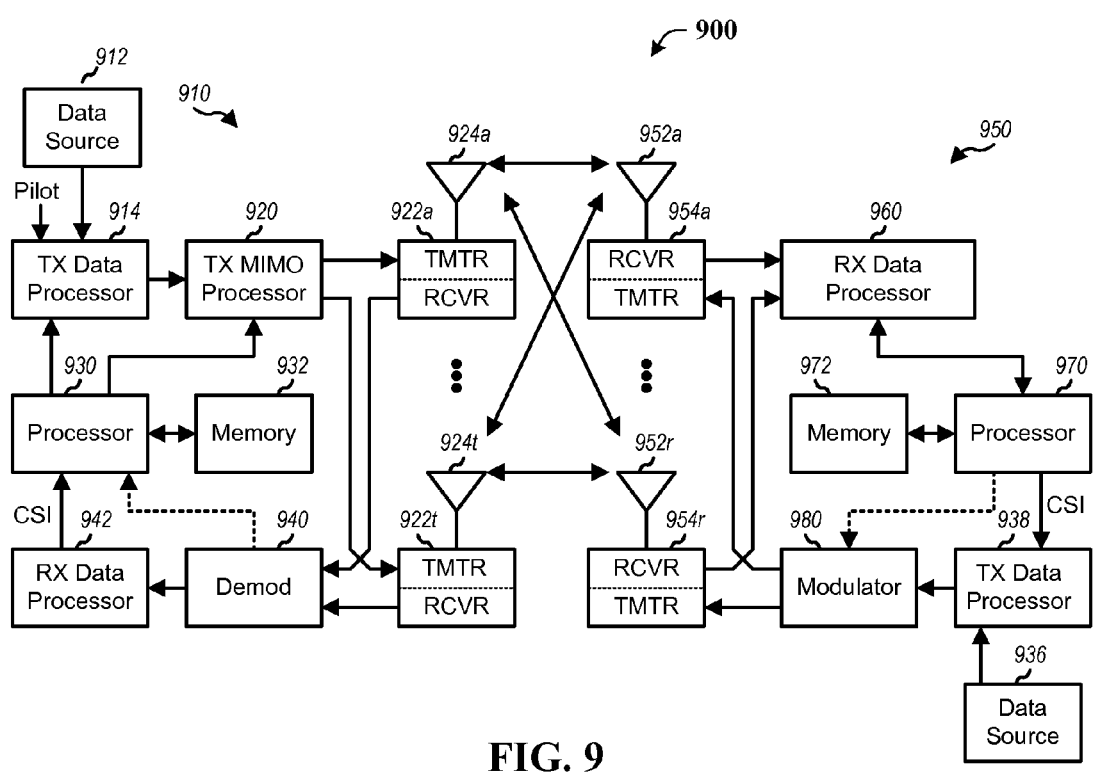
FIG. 9 depicts a block diagram of an exemplary communication system.

Referring to FIG. 9, a block diagram of an aspect of a transmitter system 910 (also known as the access point) and a receiver system 950 (also known as access terminal) in a MIMO system 900 is illustrated. At the transmitter system 910, traffic data for a number of data streams is provided from a data source 912 to a transmit (TX) data processor 914.

In an aspect, each data stream is transmitted over a respective transmit antenna. TX data processor 914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 930.

The modulation symbols for all data streams are then provided to a TX MIMO processor 920, which may further process the modulation symbols (e.g., for OFDM). TX MIMO processor 920 then provides $N_T$ modulation symbol streams to $N_T$ transmitters (TMTR) 922a through 922t. In certain aspects, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 922a through 922t are then transmitted from $N_T$ antennas 924a through 924t, respectively.

At receiver system 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective received signal, digitizes the conditioned signal to provide samples, and further processes the samples to provide a corresponding "received" symbol stream.

An RX data processor 960 then receives and processes the $N_R$ received symbol streams from $N_R$ receivers 954 based on a particular receiver processing technique to provide $N_T$ "detected" symbol streams. The RX data processor 960 then demodulates, deinterleaves, and decodes each detected symbol stream to recover the traffic data for the data stream. The processing by RX data processor 960 is complementary to that performed by TX MIMO processor 920 and TX data processor 914 at transmitter system 910.

A processor 970 periodically determines which pre-coding matrix to use (discussed below). Processor 970 formulates a reverse link message comprising a matrix index portion and a rank value portion.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by transmitters 954a through 954r, and transmitted back to transmitter system 910.

At transmitter system 910, the modulated signals from receiver system 950 are received by antennas 924, conditioned by receivers 922, demodulated by a demodulator 940, and processed by a RX data processor 942 to extract the reserve link message transmitted by the receiver system 950. Processor 930 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels may comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations may apply:
AM Acknowledged Mode
AMD Acknowledged Mode Data
ARQ Automatic Repeat Request
BCCH Broadcast Control Channel
BCH Broadcast Channel
C- Control-
CCCH Common Control Channel
CCH Control Channel
CCTrCH Coded Composite Transport Channel
CP Cyclic Prefix
CRC Cyclic Redundancy Check
CTCH Common Traffic Channel
DCCH Dedicated Control Channel
DCH Dedicated Channel
DL DownLink
DSCH Downlink Shared Channel
DTCH Dedicated Traffic Channel
FACH Forward link Access Channel
FDD Frequency Division Duplex
L1 Layer 1 (physical layer)
L2 Layer 4 (data link layer)
L3 Layer 4 (network layer)
LI Length Indicator
LSB Least Significant Bit
MAC Medium Access Control
MBMS Multimedia Broadcast Multicast Service
MCCH MBMS point-to-multipoint Control Channel
MRW Move Receiving Window
MSB Most Significant Bit
MSCH MBMS point-to-multipoint Scheduling Channel
MTCH MBMS point-to-multipoint Traffic Channel
PCCH Paging Control Channel
PCH Paging CHannel
PDU Protocol Data Unit
PHY Physical layer
PhyCH Physical Channels
RACH Random Access Channel
RLC Radio Link Control
RRC Radio Resource Control
SAP Service Access Point
SDU Service Data Unit
SHCCH Shared channel Control Channel
SN Sequence Number
SUFI Super Field
TCH Traffic Channel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel Further, for example, the present aspects may be applied to a Long Term Evolution (LTE) system, including components such as: an Evolved NodeB (E-NodeB), which has base station functionality; an Evolved UMTS Terrestrial Radio Access Network (E-UTRAN), which is the network that includes the E-NodeBs; and an Evolved Packet Core (EPC), also known as a System Architecture Evolution (SAE) core, which serves as the equivalent of GPRS networks via the Mobility Management Entity (MME), Serving Gateway (S-GW) and Packet Data Node (PDN) Gateway sub components.

The MME is a control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 4G/3G access networks with the S3 interface terminating at the MME from the SGSN. The MME also terminates the S6a interface towards the home HSS for roaming UEs.

The SGW routes and forwards user data packets, while also acting as the mobility anchor for the user plane during inter-E-NodeB handovers and as the anchor for mobility between LTE and other 4GPP technologies (terminating S4 interface and relaying the traffic between 4G/3G systems and PDN GW). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

The PDN GW provides connectivity to the UE to external packet data networks by being the point of exit and entry of traffic for the UE. A UE may have simultaneous connectivity with more than one PDN GW for accessing multiple PDNs. The PDN GW performs policy enforcement, packet filtering for each user, charging support, lawful Interception and packet screening. Another role of the PDN GW is to act as the anchor for mobility between 4GPP and non-3GPP technologies such as WiMAX and 4GPP2 (CDMA 1x and EvDO).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 4GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 4" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method to facilitate access terminal handoff between access networks, the method comprising:

receiving, at a first access network (AN), a handoff request and an access channel message from an access terminal (AT), wherein the access channel message includes information corresponding to a communication session between a second AN and the AT, wherein the communication session includes at least an active personality negotiated with the second AN;

obtaining multiple personalities, associated with the AT, previously negotiated by the first AN;

determining if one of the multiple obtained personalities is substantially similar to the active personality;

upon a determination that one of the multiple obtained personalities is substantially similar to the active personality, transferring the communication session to the first AN with the obtained personality substantially similar to the active personality, wherein transferring the communication session comprises determining if the transferred communication session and the communication session between the second AN and the AT have the same index for the active personality;

receiving, from the second AN, session information corresponding to one or more inactive personalities indexed in the communication session between the second AN and the AT;

determining if any of the one or more inactive personalities indexed in the communication session between the second AN and the AT are substantially similar to any of the multiple obtained personalities previously negotiated by the first AN;

upon a determination that at least one of the one or more inactive personalities indexed in the communication session between the second AN and the AT is substantially similar to at least one of the multiple obtained personalities, transmitting instructions to the AT to reindex the at least one inactive personality that is substantially similar to the at least one obtained personality; and receiving acknowledgement of any inactive personality index changes from the AT.

2. The method of claim 1, further comprising:

upon the determination that the at least one inactive personality indexed in the communication session between the second AN and the AT is substantially similar to the at least one obtained personality, generating a new communication session index populated with the at least one obtained personality that is substantially similar to the at least one inactive personality indexed in the communication session between the second AN and the AT and associating the transferred communication session with the new communication session index.

3. The method of claim 2, further comprising:
transmitting, from the first AN, a session information request to the second AN, wherein the session information request includes a request for information corresponding to the communication session between the second AN and the AT and any inactive personalities indexed in the communication session between the second AN and the AT.

4. The method of claim 2, wherein generating the new communication session index includes hardlink streaming the at least one inactive personality indexed in the communication session between the second AN and the AT to the at least one substantially similar obtained personality in the transferred communication session.

5. The method of claim 2, further comprising:
determining if the new communication session index includes any personalities not corresponding to personalities negotiated with the second AN;
upon a determination that the new communication session index includes any personalities not corresponding to personalities negotiated with the second AN, transmitting instructions to the access terminal to perform a session negotiation with the first AN to populate the new communication session index with additional personalities, wherein the additional personalities do not include the active personality or any reindexed inactive personalities, and to remove any personalities indexed in the communication session between the second AN and the AT that are not substantially similar to any of the multiple obtained personalities previously negotiated by the first AN.

6. The method of claim 2, further comprising:
determining if the new communication session index is configured to index less personalities than the communication session between the second AN and the AT;
upon a determination that the new communication session index is configured to index less personalities than the communication session between the second AN and the AT, transmitting instructions to the access terminal to perform a session negotiation with the first AN to populate the new communication session index with additional personalities that are not substantially similar to any personalities indexed in the communication session between the second AN and the AT, and to remove any personalities indexed in the communication session between the second AN and the AT that are not substantially similar to any of the multiple obtained personalities previously negotiated by the first AN.

7. The method of claim 1, wherein the communication session further comprises a 1×EV-DO communication session.

8. The method of claim 1, wherein the access channel message includes at least one of a unicast access terminal identifier or a session configuration token that includes information identifying the AT.

9. The method of claim 1, wherein transferring the communication session to the first AN further comprises,
upon a determination that the communication sessions do not have the same index for the active personality, transmitting instructions to the AT to maintain the active personality by switching to a new communication session index that the transferred communication session has for the active personality.

10. At least one processor configured to facilitate access terminal handoff between access networks, wherein the at least one processor comprises:
a first module for receiving, at a first access network (AN), a handoff request and an access channel message from an access terminal (AT), wherein the access channel message includes information corresponding to a communication session between a second AN and the AT, wherein the communication session includes at least an active personality negotiated with the second AN;
a second module for obtaining multiple personalities, associated with the AT, previously negotiated by the first AN;
a third module for determining if one of the multiple obtained personalities is substantially similar to the active personality;
a fourth module for transferring the communication session to the first AN with the obtained personality substantially similar to the active personality, upon a determination that one of the multiple obtained personalities is substantially similar to the active personality, wherein transferring the communication session comprises determining if the transferred communication session and the communication session between the second AN and the AT have the same index for the active personality;
a fifth module for receiving, from the second AN, session information corresponding to one or more inactive personalities indexed in the communication session between the second AN and the AT;
a sixth module for determining if any of the one or more inactive personalities indexed in the communication session between the second AN and the AT are substantially similar to any of the multiple obtained personalities previously negotiated by the first AN;
a seventh module for transmitting, upon a determination that at least one of the one or more inactive personalities indexed in the communication session between the second AN and the AT is substantially similar to at least one of the multiple obtained personalities, instructions to the AT to reindex the at least one inactive personality that is substantially similar to the at least one obtained personality; and
an eighth module for receiving acknowledgement of any inactive personality index changes from the AT.

11. A computer program product, comprising:
a non-transitory computer-readable storage medium comprising:
a first set of codes for causing a computer to receive, at a first access network (AN), a handoff request and an access channel message from an access terminal (AT), wherein the access channel message includes information corresponding to a communication session between a second AN and the AT, wherein the communication session includes at least an active personality negotiated with the second AN;
a second set of codes for causing the computer to obtain multiple personalities, associated with the AT, previously negotiated by the first AN;
a third set of codes for causing the computer to determine if one of the multiple obtained personalities is substantially similar to the active personality;
a fourth set of codes for causing the computer to transfer the communication session to the first AN with the obtained personality substantially similar to the active personality, upon a determination that one of the multiple obtained personalities is substantially similar to the active personality, wherein transferring the communication session comprises determining if the transferred communication session and the communication session between the second AN and the AT have the same index for the active personality;

a fifth set of codes for receiving, from the second AN, session information corresponding to one or more inactive personalities indexed in the communication session between the second AN and the AT;

a sixth set of codes for determining if any of the one or more inactive personalities indexed in the communication session between the second AN and the AT are substantially similar to any of the multiple obtained personalities previously negotiated by the first AN;

a seventh set of codes for transmitting, upon a determination that at least one of the one or more inactive personalities indexed in the communication session between the second AN and the AT is substantially similar to at least one of the multiple obtained personalities, instructions to the AT to reindex the at least one inactive personality that is substantially similar to the at least one obtained personality; and an eighth set of codes for receiving acknowledgement of any inactive personality index changes from the AT.

12. An apparatus, comprising:

means for receiving, at a first access network (AN), a handoff request and an access channel message from an access terminal (AT), wherein the access channel message includes information corresponding to a communication session between a second AN and the AT, wherein the communication session includes at least an active personality negotiated with the second AN;

means for obtaining multiple personalities, associated with the AT, previously negotiated by the first AN;

means for determining if one of the multiple obtained personalities is substantially similar to the active personality;

means for transferring the communication session to the first AN with the obtained personality substantially similar to the active personality, upon a determination that one of the multiple obtained personalities is substantially similar to the active personality, wherein transferring the communication session comprises determining if the transferred communication session and the communication session between the second AN and the AT have the same index for the active personality;

means for receiving, from the second AN, session information corresponding to one or more inactive personalities indexed in the communication session between the second AN and the AT;

means for determining if any of the one or more inactive personalities indexed in the communication session between the second AN and the AT are substantially similar to any of the multiple obtained personalities previously negotiated by the first AN;

means for transmitting, upon a determination that at least one of the one or more inactive personalities indexed in the communication session between the second AN and the AT is substantially similar to at least one of the multiple obtained personalities, instructions to the AT to reindex the at least one inactive personality that is substantially similar to the at least one obtained personality; and means for receiving acknowledgement of any inactive personality index changes from the AT.

13. An apparatus for facilitating access terminal handoff between access networks, the apparatus comprising:

a receiver operable for:
receiving, at a first access network (AN), a handoff request and an access channel message from an access terminal (AT), wherein the access channel message includes information corresponding to a communication session between a second AN and the AT, wherein the communication session includes at least an active personality negotiated with the second AN;

receiving, from the second AN, session information corresponding to one or more inactive personalities indexed in the communication session between the second AN and the AT; and receiving acknowledgement of any inactive personality index changes from the AT; a personality manager operable for:

obtaining multiple personalities, associated with the AT, previously negotiated by the first AN;

determining if one of the multiple obtained personalities is substantially similar to the active personality;

upon a determination that one of the multiple obtained personalities is substantially similar to the active personality, transferring the communication session to the first AN with the obtained personality substantially similar to the active personality, wherein transferring the communication session comprises determining if the transferred communication session and the communication session between the second AN and the AT have the same index for the active personality; and determining if any of the one or more inactive personalities indexed in the communication session between the second AN and the AT are substantially similar to any of the multiple obtained personalities previously negotiated by the first AN; and a transmitter operable for, upon a determination that at least one of the one or more inactive personalities indexed in the communication session between the second AN and the AT is substantially similar to at least one of the multiple obtained personalities, transmitting instructions to the AT to reindex the at least one inactive personality that is substantially similar to the at least one obtained personality.

14. The apparatus of claim 13, wherein:

the personality manager is further operable for:
upon the determination that the at least one inactive personality indexed in the communication session between the second AN and the AT is substantially similar to the at least one obtained personality, generating a new communication session index populated with the at least one obtained personality that is substantially similar to the at least one inactive personality indexed in the communication session between the second AN and the AT and associating the transferred communication session with the new communication session index.

15. The apparatus of claim 14, further comprising:

the transmitter is further operable for transmitting, from the first AN, a session information request to the second AN, wherein the session information request includes a request for information corresponding to the communication session between the second AN and the AT and any inactive personalities indexed in the communication session between the second AN and the AT.

16. The apparatus of claim 14, wherein generating the new communication session index includes hardlink streaming the at least one inactive personality indexed in the communication session between the second AN and the AT to the at least one substantially similar obtained personality in the transferred communication session.

17. The apparatus of claim 14, wherein the personality manager is further operable for:
determining if the new communication session index includes any personalities not corresponding to personalities negotiated with the second AN;
upon a determination that the new communication session index includes any personalities not corresponding to personalities negotiated with the second AN, transmitting instructions to the access terminal to perform a session negotiation with the first AN to populate the new communication session index with additional personalities, wherein the additional personalities do not include the active personality or any reindexed inactive personalities, and to remove any personalities indexed in the communication session between the second AN and the AT that are not substantially similar to any of the multiple obtained personalities previously negotiated by the first AN.

18. The apparatus of claim 14, wherein the personality manager is further operable for:
determining if the new communication session index is configured to index less personalities than the communication session between the second AN and the AT;
upon a determination that the new communication session index is configured to index less personalities than the communication session between the second AN and the AT, transmitting instructions to the access terminal to perform a session negotiation with the first AN to populate the new communication session index with additional personalities that are not substantially similar to any personalities indexed in the communication session between the second AN and the AT, and to remove any personalities indexed in the communication session between the second AN and the AT that are not substantially similar to any of the multiple obtained personalities previously negotiated by the first AN.

19. The apparatus of claim 13, wherein the communication session further comprises a 1×EV-DO communication session.

20. The apparatus of claim 13, wherein the access channel message includes at least one of a unicast access terminal identifier or a session configuration token that includes information identifying the AT.

21. The apparatus of claim 13, wherein
the transmitter is further operable for transmitting instructions to the access terminal to maintain the active personality by switching to a new communication session index that the transferred communication session has for the active personality upon a determination that the communication sessions do not have the same index for the active personality.

22. A method to facilitate personality modification by an access terminal during handoff between access networks, the method comprising:
transmitting, from an access terminal (AT), a handoff request and an access channel message to a first access network (AN), wherein the access channel message includes information corresponding to a communication session between a second AN and the AT, wherein the communication session includes at least an active personality negotiated with the second AN;
receiving instructions from the first AN to maintain the active personality by switching to a new communication session index that the first AN has for the active personality when a transferred communication session and the communication session between the second AN and the AT do not have the same index for the active personality;
receiving instructions from the first AN to reindex, according to the new communication session index, at least one inactive personality indexed in the communication session between the second AN and the AT that is substantially similar to at least one personality previously negotiated by the first AN; and
transmitting acknowledgement of any inactive personality index changes to the first AN.

23. The method of claim 22, wherein the communication session further comprises a 1×EV-DO communication session.

24. The method of claim 22, wherein the access channel message includes at least one of a unicast access terminal identifier or a session configuration token that includes information identifying the AT.

25. The method of claim 22, further comprising:
receiving, at the AT, instructions to perform a session negotiation with the first AN to populate the new communication session index with additional personalities, wherein the additional personalities do not include the active personality or any reindexed inactive personalities, and to remove any personalities indexed in the communication session between the second AN and the AT that are not substantially similar to any personalities indexed in the new communication session index; and
transmitting, to the first AN, a session request to negotiate the additional personalities and populate the new communication session index.

26. At least one processor configured to facilitate personality modification by an access terminal during handoff between access networks, wherein the at least one processor comprises:
a first module for transmitting, from an access terminal (AT), a handoff request and an access channel message to a first access network (AN), wherein the access channel message includes information corresponding to a communication session between a second AN and the AT, wherein the communication session includes at least an active personality negotiated with the second AN;
a second module for receiving instructions from the first AN to maintain the active personality by switching to a new communication session index that the first AN has for the active personality when a transferred communication session and the communication session between the second AN and the AT do not have the same index for the active personality;
a third module for receiving instructions from the first AN to reindex, according to the new communication session index, at least one inactive personality indexed in the communication session between the second AN and the AT that is substantially similar to at least one personality previously negotiated by the first AN; and
a fourth module for transmitting acknowledgement of any inactive personality index changes to the first AN.

27. A computer program product, comprising:
a non-transitory computer-readable storage medium comprising:
a first set of codes for causing a computer to transmit, from an access terminal (AT), a handoff request and an access channel message to a first access network (AN), wherein the access channel message includes information corresponding to a communication session between a second AN and the AT, wherein the communication session includes at least an active personality negotiated with the second AN;

a second set of codes for causing the computer to receive instructions from the first AN to maintain the active personality by switching to a new communication session index that the first AN has for the active personality when a transferred communication session and the communication session between the second AN and the AT do not have the same index for the active personality;

a third set of codes for causing the computer to receive instructions from the first AN to reindex, according to the new communication session index, at least one inactive personality indexed in the communication session between the second AN and the AT that is substantially similar to at least one personality previously negotiated by the first AN; and a fourth set of codes for causing the computer to transmit acknowledgement of any inactive personality index changes to the first AN.

28. An apparatus, comprising:

means for transmitting, from an access terminal (AT), a handoff request and an access channel message to a first access network (AN), wherein the access channel message includes information corresponding to a communication session between a second AN and the AT, wherein the communication session includes at least an active personality negotiated with the second AN;

means for receiving instructions from the first AN to maintain the active personality by switching to a new communication session index that the first AN has for the active personality when a transferred communication session and the communication session between the second AN and the AT do not have the same index for the active personality;

means for receiving instructions from the first AN to reindex, according to the new communication session index, at least one inactive personality indexed in the communication session between the second AN and the AT that is substantially similar to at least one personality previously negotiated by the first AN; and means for transmitting acknowledgement of any inactive personality index changes to the first AN.

29. An apparatus for facilitating personality modification by an access terminal during handoff between access networks, the apparatus comprising:

a transmitter operable for transmitting, from an access terminal (AT), a handoff request and an access channel message to a first access network (AN), wherein the access channel message includes information corresponding to a communication session between a second AN and the AT, wherein the communication session includes at least an active personality negotiated with the second AN, and for transmitting acknowledgement of any inactive personality index changes to the first AN; and a receiver operable for receiving instructions from the first AN to maintain the active personality by switching to a new communication session index that the first AN has for the active personality when a transferred communication session and the communication session between the second AN and the AT do not have the same index for the active personality, and for receiving instructions from the first AN to reindex, according to the new communication session index, at least one inactive personality indexed in the communication session between the second AN and the AT that is substantially similar to at least one personality previously negotiated by the first AN.

30. The apparatus of claim 29, wherein the communication session further comprises a 1×EV-DO communication session.

31. The apparatus of claim 29, wherein the access channel message includes at least one of unicast access terminal identifier or a secession configuration token that includes information identifying the AT.

32. The apparatus of claim 29 wherein the receiver is further operable for receiving, at the AT, instructions to perform a session negotiation with the first AN to populate the new communication session index with additional personalities, wherein the additional personalities do not include the active personality or any reindexed inactive personalities, and to remove any personalities indexed in the communication session between the second AN and the AT that are not substantially similar to any personalities indexed in the new communication session index; and the transmitter is further operable for transmitting, to the first AN, a session request to negotiate the additional personalities and populate the new communication session index.

* * * * *